United States Patent
Haubmann (10) Patent No.: US 12,425,742 B2
(45) Date of Patent: Sep. 23, 2025

(54) METHOD FOR RECORDING A SEQUENCE OF IMAGES

(71) Applicant: Arnold & Richter Cine Technik GmbH & Co. Betriebs KG, Munich (DE)

(72) Inventor: Michael Haubmann, Vienna (AT)

(73) Assignee: ARNOLD & RICHTER CINE TECHNIK GMBH & CO. BETRIEBS KG, Munich (DE)

( * ) Notice: Subject to any disclaimer, the term of this patent is extended or adjusted under 35 U.S.C. 154(b) by 255 days.

(21) Appl. No.: 18/129,217

(22) Filed: Mar. 31, 2023

(65) Prior Publication Data
US 2023/0319422 A1 Oct. 5, 2023

(30) Foreign Application Priority Data
Apr. 1, 2022 (DE) .......................... 102022107815.9

(51) Int. Cl.
*H04N 5/335* (2011.01)
*G03B 7/093* (2021.01)
(Continued)

(52) U.S. Cl.
CPC ............ *H04N 23/73* (2023.01); *G03B 7/093* (2013.01); *H04N 23/71* (2023.01); *H04N 23/74* (2023.01)

(58) Field of Classification Search
CPC ...................................................... H04N 23/72
See application file for complete search history.

(56) References Cited

U.S. PATENT DOCUMENTS 8,275,212 B2    9/2012 Makii
8,525,925 B2 *  9/2013 Jannard ................. H04N 23/65
                                                  348/374
(Continued)

FOREIGN PATENT DOCUMENTS

DE    102013209164 A1   12/2014
EP      1389006 A2       2/2004
(Continued)

OTHER PUBLICATIONS

German Patent and Trademark Office Communication issued in Application No. 10 2022 107 815.9, dated Sep. 28, 2022, No Translation Provided.
(Continued)

*Primary Examiner* — Gary C Vieaux
(74) *Attorney, Agent, or Firm* — Amster Rothstein & Ebenstein LLP (57) ABSTRACT

In a method for recording a sequence of images by means of a digital motion picture camera, an image sensor generates electrical signals in dependence of the exposure. At least two exposure changing devices are provided, which are configured to influence the exposure of the image sensor by a setting of a respective operation parameter. One of the exposure changing devices is provided as a variation device or can be selected as such, and a further exposure changing device is provided as a compensation device or can be selected as such. During a recording of a sequence of images, the following steps are performed: influencing the exposure of the image sensor by changing the setting value of the operation parameter of the variation device; receiving the changed setting value; determining a respective adjustment value of the operation parameter of the compensation device and outputting the respective adjustment value to the compensation device, wherein an influence on the exposure of the image sensor caused by a change in the setting value
(Continued)

is at least substantially compensated by a change in the respective adjustment value; and operating the at least one compensation device in accordance with the outputted respective adjustment value.

16 Claims, 1 Drawing Sheet

(51) Int. Cl.
*H04N 23/71* (2023.01)
*H04N 23/73* (2023.01)
*H04N 23/74* (2023.01)

(56) References Cited

U.S. PATENT DOCUMENTS

| | | |
|---|---|---|
| 2004/0218246 A1 | 11/2004 | Onuki et al. |
| 2012/0062845 A1* | 3/2012 | Davis ................... G02B 5/204 |
| | | 352/219 |
| 2016/0381270 A1* | 12/2016 | Davis ................... H04N 23/73 |
| | | 348/362 |
| 2020/0068112 A1* | 2/2020 | Zhang ................. H04N 23/681 |
| 2022/0236625 A1* | 7/2022 | Citerin .................. H04N 23/62 |

FOREIGN PATENT DOCUMENTS

| | | |
|---|---|---|
| EP | 3624438 A2 | 3/2020 |
| GB | 2587206 A | 3/2021 |

OTHER PUBLICATIONS

European Patent Office Communication issued in Application No. 23161657.4, dated Aug. 23, 2023, No Translation Provided.

* cited by examiner

METHOD FOR RECORDING A SEQUENCE OF IMAGES

The present invention relates to a method for recording a sequence of images by means of a digital motion picture camera comprising an image sensor for generating electrical signals in dependence of an exposure of the image sensor.

Known digital motion picture cameras typically use an image sensor in CMOS or CCD technology which comprises a plurality of photosensitive elements, so-called pixels. Typically, the pixels are arranged in rows and columns as a two-dimensional matrix. The pixels convert impinging light into electrical signals. The light passes to the image sensor through an objective (also referred to as a lens, even if there are more than one physical lenses) connected to the motion picture camera. The signals may be electrical charges, currents or voltages, for example. A respective signal represents a charge of the respective pixel collected in dependence of the light exposure. In this context, the exposure may be influenced in particular by the intensity, duration and/or wavelength of the impinging light.

Within the pixels and/or in a separate readout circuit which may be arranged at the edge of the image field of the image sensor formed by the pixels, the signals of the pixels are usually converted into electrical voltages. In addition, the signals may be amplified by an amplifier device according to a fixed or adjustable gain factor to form amplified image signals. The image signals may be digitized within the motion picture camera by one or more analog-to-digital converters. Scaling of the image signals may take place on the digital level (so-called mapping). The digital image signals may be recorded in an internal storage device of the motion picture camera and/or output at one or more outputs of the motion picture camera.

By means of the digital motion picture camera, a sequence of consecutive images, i.e. a film scene, is recorded, whereby the image signals correspond to a respective image. Consequently, the brightness of a respective image depends, on the one hand, on the aforementioned amplification factor by which the signals generated by the image sensor are amplified and, on the other hand, on the exposure, i.e. the amount of light incident on the image sensor. This amount of light, for the given light conditions of the recorded film scene, is substantially determined by the exposure time as well as by the diaphragm (also known as aperture stop) of an objective connected to the film camera, wherein the transmission of the optics (transmission plus diaphragm aperture results in the so-called T number) and any filters present (e.g. neutral density filters) also influence the exposure and thus the brightness of the image. A diaphragm of an objective (e.g. iris diaphragm) defines an adjustable opening cross-section, referred to as a diaphragm aperture, and which limits the cross-section of the light beam entering the motion picture camera through the objective. Thus, the amount of light incident on the image sensor depends on the size of the set diaphragm aperture. It is usual to specify the diaphragm aperture by means of uniformly defined aperture-numbers (also referred to as "f-number" or "f-stop"), e.g. 1/2,8. Independent of this convention, the value of the set, or to be set, diaphragm aperture is also referred to as the aperture value.

The set diaphragm aperture has not only an influence on the amount of light (exposure) incident on the image sensor, but also the distance range referred to as depth-of-focus (often also referred to as depth-of-field), in which the subject or the film scene is sharply imaged on the image sensor. A change to the diaphragm aperture may also occur for the image design, for example, to deliberately bring about depth blur effects by which specific distance ranges (e.g. actors) in the film scene may be emphasized over other areas (foreground/background). However, such a change to the diaphragm aperture for solely changing the depth-of-focus should not lead to a noticeable change of brightness in the sequence of recorded images or to any other noticeable image parameter.

Another method of image design is to vary the exposure time during recording of the motion picture sequence. Here, harmonic movements in the film scene may be converted into a kind of stroboscopic effect and vice versa. In this context, a stroboscopic effect is to be understood as the ratio of integration time to non-integration time of the image sensor. The variation of the exposure time may take place, for example, by setting the exposure time of an electronic shutter of the image sensor. For this purpose, the integration time of the image sensor, i.e. the period of time that elapses between a clearing or re-setting of the image sensor and the start of the readout of the image sensor, may be set. Alternatively or additionally, the shutter speed of a mechanical shutter may also be varied. Rotating sector diaphragms are frequently used as mechanical shutters in motion picture cameras, wherein the sector angle, i.e. the open angular range of the sector diaphragm, may be changed to set the exposure time.

Another method used for image design is to vary the image recording rate (also known as frame rate) with which the sequence of images is recorded, during a running sequence recording. This makes it possible to realize transitions between a recording in real-time, time-lapse and/or slow-motion. A change to the image recording rate also influences the amount of time available per image for integration, which also leads to variations in the exposure of the image sensor.

From DE 10 2013 209 164 A1 it is known to compensate for a change in the exposure of the image sensor caused by an adjustment to the diaphragm aperture during the recording of the sequence of images, by an adapted electrical amplification of the signals of the image sensor. However, in this case there is a disadvantage in that an increase in the amplification factor of the amplifier circuit may also increase the image noise of the image sensor used. As a result, the quality of the images generated may be affected.

A further problem with such an exposure compensation is that the effects that occur may exhibit non-linearities, so that a deterministic correction often only delivers inadequate results.

It is an object of the invention to provide a method for recording a sequence of images by means of a digital motion picture camera, by which the possibilities of image design are improved by the influencing of operation parameters of the motion picture camera during a running recording without any undesired impairing to the image quality. It is also an object of the invention to provide a calibration method for an exposure compensation which also takes into consideration non-linearities in the relationships between the various operation parameters, through an empirical approach.

This object is achieved by a method having the features of claim 1.

The present invention provides a method for recording a sequence of images by means of a digital motion picture camera comprising an image sensor for generating electrical signals in dependence of an exposure of the image sensor. At least two exposure changing devices are provided, each of which is configured to influence the exposure of the image sensor by a setting of an associated operation parameter. The operation parameter associated with the respective exposure changing device may be, for example, an exposure time, a diaphragm value or an image recording rate, as will be further described below. The exposure changing devices are selected from a group of exposure changing devices comprising at least one image recording rate setting device, a diaphragm aperture setting device, an electronic shutter of the image sensor, a mechanical shutter, an adjustable neutral density filter and at least one controllable illumination device for illuminating a subject which can be captured by the motion picture camera.

One of the exposure changing devices is provided or can be selected as a variation device, and at least one further exposure changing device, different to the variation device, is provided or can be selected as an at least one compensation device. A single compensation device or a plurality of compensation devices (in particular, similar type or different types of compensation devices) may be provided. At least one control device is provided, which is configured for directly or indirectly receiving a setting value of the operation parameter of the variation device and for outputting a respective adjustment value to the at least one compensation device.

The method comprises the following steps, which are performed in a variation operation during a recording of a sequence of images:
  influencing the exposure of the image sensor by changing the setting value of the operation parameter associated with the variation device;
  receiving the changed setting value (for example, by a direct or indirect transmitting to the control device);
  determining a respective adjustment value of the operation parameter of the compensation device (or devices) and outputting the respective adjustment value from the control device to the compensation device(s) in dependence of the received changed setting value of the operation parameter of the variation device, wherein the respective adjustment value is selected such that an influence on the exposure of the image sensor, caused by the change to the setting value, is at least substantially compensated by a change to the respective adjustment value; and
  operating the compensation device or devices in accordance with the outputted respective adjustment value.

The exposure of the image sensor is made on the basis of an imaging of the object space having a subject located therein, onto the image sensor. The imaging is usually carried out with the help of an objective arranged at the motion picture camera. Said exposure changing devices are, in particular, devices for varying recording parameters which directly or indirectly influence the brightness of an image or image sequence generated by the image sensor. The exposure changing devices may be part of the motion picture camera or may also be external devices which are mechanically and/or communicatively coupled to or can be coupled to the motion picture camera and/or the control device.

Of the at least two exposure changing devices, one functions as a variation device, wherein a desired creative effect may be achieved by a setting of the operation parameter of this variation device. The setting of the operation parameter associated with the variation device may be carried out by a user of the motion picture camera (e.g. camera operator, camera assistant), for example, manually, electrically or electromechanically, in particular via an operating unit (e.g. with a button, slider, rocker, rotary wheel), wherein such an operating unit may also be configured as a remote control unit. The variation device may be, for example, a diaphragm aperture setting device in which the diaphragm value may be varied as an operation parameter. The exposure changing device that is to function as a variation device is either specified or may be selected by the user, wherein not all available exposure changing devices must necessarily be selectable also as a variation device.

For a respective specified or selected variation device, one or also a plurality of the exposure changing devices may be specified or can be selected as the respective compensation device. For the example mentioned above, in which the diaphragm aperture setting device is provided as a variation device, at least the electronic shutter of the image sensor may be specified or can be selected as a compensation device, for example. Additionally, one or a plurality of other exposure changing devices, such as an adjustable neutral density filter and/or an external illumination, may be selected.

If, for example, the diaphragm aperture is reduced for design purposes by means of said diaphragm aperture setting device but without any compensation this will lead to a reduction in the exposure of the image sensor. This reduction in image brightness may, in the example, be compensated directly by increasing the exposure time of the electronic shutter of the image sensor, so that the effective exposure of the image sensor, at least with respect to this cause (actuation of the variation device), does not change. It is understood, however, that further effects influencing the image brightness, resulting for example from a movement within the subject, are not compensated by the method according to the invention. Also, effects resulting, for example, from a change in the illumination brightness of the film scene (for example, the simulation of a sunrise or the switching on of a light) are not compensated within the scope of the method according to the invention.

However, when compensating for the influence of the exposure, the electrical amplification of the image signals in the image sensor is generally held constant, i.e. where appropriate a variable amplification factor of an electrical amplifier circuit is not changed or not necessarily changed, at least within the scope of compensation according to the invention.

Changing the setting value of the operation parameter of the variation device may be carried out in discrete steps or also continuously, wherein the changing step may be performed manually by a user or also automated on the basis of a specified course, for example a ramp function.

The control device, which is configured to perform the method, may be a control device integrated in the motion picture camera, which may be configured, for example, as a part of a control device of the motion picture camera, or it may also be a dedicated sub-unit of the motion picture camera. Alternatively, an external control device may also be provided which is coupled to or can be coupled to the motion picture camera and the exposure changing devices. For example, the control device may include one or more of the following devices: an integrated circuit (IC), a microprocessor, a central processing unit (CPU), an application specific integrated circuit (ASIC), or a field programmable gate array (FPGA).

Receiving the setting value of the operation parameter of the variation device does not necessarily require the presence of a sensor device at the variation device for generating and/or transmitting the setting value, so as to determine for instance an actual value. The setting value may also be transmitted internally, for example when the method is performed within a control device of the motion picture camera. In particular, the setting value may also be provided in the form of a desired value that is output to both the variation device and the control device, for example, as an automated variation based on a given course.

Changing the adjustment value of the at least one compensation device and transmitting the changed adjustment value to the at least one compensation device is usually carried out in such a way that, starting from a previous absolute value of the adjustment value, i.e. a currently set value of the operation parameter of the compensation device, a new absolute value of this operation parameter is output which compensates for the influence on the exposure. The compensation device or devices is/are thus operated on the basis of the transmitted changed adjustment value.

The image recording rate adjustment device may include, for example, a control circuit (in particular, an integrated circuit, a microprocessor, an application-specific integrated circuit or a field programmable gate array) which controls the cycle duration of successive readout cycles of the image sensor and/or the rotational frequency of a rotating sector diaphragm located in the beam path. This control circuit may also be an integral part of said control device, which determines and outputs the respective adjustment value of the operation parameter of the compensation device. The diaphragm aperture setting device may, for example, comprise an iris diaphragm whose aperture cross-section (in particular the position of movable blades) is electromechanically adjustable. The electronic shutter of the image sensor may, for example, comprise a control circuit (in particular, an integrated circuit, a microprocessor, an application-specific integrated circuit or a field programmable gate array) which controls the amount of time that elapses between the start and the end of photoelectric generation of charge in the pixels of the image sensor. This control circuit may also be an integral part of said control device, which determines and outputs the respective adjustment value of the operation parameter of the compensation device. The mechanical shutter may comprise, for example, a rotating sector diaphragm located in the beam path of the motion picture camera, whose open angle range is electromechanically adjustable. The adjustable neutral density filter may comprise, for example, an electromechanically controllable filter wheel, an arrangement of filter elements that can be positioned one behind the other in the beam path and are electromechanically controllable in discrete increments, or a discretely or continuously electrically controllable LCD filter.

The respective controllable illumination device may comprise, for example, a spotlight or a light panel (in particular, having LED light sources). In particular, illuminating systems having a plurality of light sources may also be provided. Such illuminating systems having a plurality of light sources may in particular also comprise a so-called video wall. One or more such video walls may be part of a so-called virtual production volume. Such systems are used to represent static or also animated backgrounds or foregrounds in the film scene to be recorded. As a rule, these are large-area image screens having a plurality of active image elements whose color and/or brightness may be controlled.

According to an embodiment, a mechanical or electronic shutter of the image sensor is provided or can be selected as a variation device, whose operation parameter is an exposure time.

According to a further embodiment, a diaphragm aperture setting device is provided or can be selected as a variation device, whose operation parameter of is a diaphragm value.

According to a further embodiment, an image recording rate setting device is provided or can be selected as a variation device, whose operation parameter is an image recording rate of the image sensor.

In some embodiments, either only one of said variation devices may be fixedly specified or a selection may be made between a plurality of said variation devices. If an image recording rate setting device is provided as a variation device, adjusting the compensation device to a changed image recording rate takes into account the fact that the exposure time necessarily may not be longer than the period duration specified by the image recording rate for the recording of a single image of the image sequence. If the image recording rate is increased, the exposure time should be appropriately shortened, while if the image recording rate is reduced, an increase in the exposure time may be provided due to the then longer period duration.

In some embodiments of the method, the respective adjustment value of the operation parameter of the at least one compensation device is determined in dependence of the changed setting value of the operation parameter of the variation device based on a predetermined relationship between different setting values of the operation parameter of the variation device and associated adjustment values. In particular, said predetermined relationship may define an amount of change to the adjustment value for the operation parameter of the compensation device which is necessary in order to compensate for a particular amount of change to the setting value of the operation parameter of the variation device. It is understood that not only one predetermined relationship may exist, but rather at a time, corresponding respective predetermined relationships may be determined in dependence of the number of exposure changing devices present which may be selectively operated as a variation device or as a compensation device.

In this context, it is advantageous when in a calibration operation carried out prior to the variation operation, the predetermined relationship between the different setting values of the operation parameter of the variation device and the associated adjustment values is determined and stored in a memory device connected to or is connectable to the control device. Said predetermined relationship may be determined and stored, for example, in the form of a mapping table, a numerical or algebraic mapping function or any other algorithm, even a complex one. In particular, said predetermined relationship may define a control loop, for example, a closed loop. The memory device provided for storing the predetermined relationship may comprise, in particular, a non-volatile solid state memory (e.g. flash EEPROM). The memory device may be associated with or integrated in the control device or the respective exposure changing device. Alternatively, external storage devices such as external storage media, apps for mobile devices or their memory or also cloud-based storage devices may be provided.

Such a calibration operation enables an empirical determination and takes into consideration non-linearities in the correlations between the various operation parameters.

According to one embodiment of the calibration operation, determining the predetermined relationship may comprise, for a constant intensity of light entering the motion picture camera, setting in succession the different setting values of the operation parameter of the variation device and simultaneously thereto, determining a respective brightness value representing the exposure of the image sensor. In this embodiment, for each of the different setting values, by changing the value of the operation parameter of the at least one compensation device a respective adaptation of the adjustment value is determined such that the adaptation of the adjustment value causes the respective brightness value to correspond at least substantially to a desired value, this desired value being identical for the different setting values of the operation parameter of the variation device. This desired value is to be adhered to by the respective adaptation of the adjustment value, in particular for each of the different setting values. Said brightness value may be determined, for example, by the electronic image signals of the image sensor, which will be explained in more detail below. The determination of the respective required adaptation of the adjustment value may be carried out, for example, by means of a control loop, in particular a closed control loop, which keeps the brightness, determined for example by the image sensor, constant. The adjustment value determined by the respective adaptation, thus forms said associated adjustment value of the operation parameter of the at least one compensation device for the predetermined relationship between the different setting values of the operation parameter of the variation device and the associated adjustment values. Said predetermined relationship is determined from the entirety of the adaptations, wherein the setting of the different setting values may be performed in discrete steps or may also be performed continuously or quasi-continuously. For this purpose, an automated calibration algorithm may be provided which sets the different setting values of the operation parameter of the variation device and, in parallel therewith, determines the adaptations of the adjustment value of the compensation device necessary for compensation. A predetermined relationship may be determined for a specific desired value of the brightness value, or a plurality of respective predetermined relationships may be determined for different desired values of the brightness.

According to an alternative embodiment of the calibration operation, the determining of the predetermined relationship comprises, for a constant intensity of light entering the motion picture camera, setting in succession the different setting values of the operation parameter of the variation device and simultaneously, respective associated brightness values representing the exposure of the image sensor are determined based on image signals of the image sensor, wherein a characteristic curve of variation is determined on the basis of the different setting values and the associated brightness values. Furthermore, at least one characteristic curve of compensation is determined computationally or experimentally which, for a respective compensation device, associates a desired change in a brightness value, as captured by means of the image sensor, with a required change in the adjustment value of this compensation device, wherein, in the variation mode, the respective adjustment value of the operation parameter of the at least one compensation device is determined based on the characteristic curve of variation and the at least one characteristic curve of compensation. In other words, to determine the characteristic curve of variation in the calibration mode for the different setting values of the operation parameter of the variation device, the associated brightness values are captured and stored without a change to the adjustment values of the compensation device. The adaptations required for compensation are determined computationally including the characteristic curve of compensation. Said characteristic curves do not necessarily have to be exclusively individual characteristic curves, but may comprise, for example characteristic curves of functions or characteristic curves of fields. Said characteristic curves may be configured, for example, as algebraically or numerically defined assignment functions or also as assignment tables. In particular, said characteristic curves are part of a respective predetermined relationship. It is understood that the determination of a respective characteristic curve may in particular also comprise its storage in a memory device.

According to one embodiment, an experimental determination of the characteristic curve of compensation may comprise, for a constant intensity of light entering the motion picture camera, setting in succession different adjustment values of the compensation device and simultaneously, respective associated brightness values are determined based on image signals of the image sensor which represent the exposure of the image sensor, wherein the characteristic curve of compensation is determined on the basis of the different adjustment values and the associated brightness values. The characteristic curve of compensation is thus determined in a manner analogous to the determination of the characteristic curve of variation in the calibration mode.

Alternatively to this, the characteristic curve of compensation may also be done on a computational basis if the relationship between an input variable and an output variable is known in advance for the compensation device in question. For example, in the case of an illumination device, this relationship may be known if the input variable is the electric current required for light generation or includes a parameter linked thereto and the output variable is given as light flux generated by the illumination device. At least within certain limits, for example, a linear or other relationship between the electric current and the light flux may be assumed. In such a case, experimentally determining the characteristic curve of compensation is not necessarily required.

In some embodiments, a plurality of external illumination devices may be provided as respective compensation devices, wherein in the calibration operation, determining the predetermined relationship between the different setting values of the operation parameter of the variation device and the associated adjustment values of the external illumination devices comprises determining specific relationships performed specifically for a respective photosensitive element of the image sensor or fora respective group of adjacent photosensitive elements. In particular, a plurality of such groups of mutually adjacent photosensitive elements corresponding to a plurality of different image areas may be provided. In the subsequent variation operation, outputting a respective adjustment value to the plurality of compensation devices is carried out on the basis of this specific relationship. Thus, it is taken into account the fact that an individual illumination device possibly illuminates individual partial areas of a subject to be recorded to different degrees and possibly also reacts in different ways to changes in the adjustment value of its operation parameter. With this design, a compensation adapted to different areas in the object space or to its image on the image sensor may take place, so that an inhomogeneous illumination of the film scene or the image sensor is avoided when there is a change to the illumination intensity of this illumination device. Thus, an influence on the exposure of the image sensor caused by a change in the setting value of the operation parameter of the variation device may be compensated at least substantially homogeneously over the area of the image sensor by outputting an adapted respective adjustment value to the at least one compensation device. Accordingly, an image area-dependent compensation of variations in the exposure caused by a change in the setting value of the variation device takes place.

In some embodiments, in the calibration operation, determining the specific relationship may be performed separately for each illumination device or for a respective subset of the plurality of illumination devices. In other words, for each illumination device or a respective subset of the plurality of illumination devices, a respective separate calibration pass is performed in which only the adjustment value of one of the illumination devices or the subset of the plurality of illumination devices is changed and the adjustment values of the remaining illumination devices are kept constant or the remaining illumination devices are disabled.

According to a further embodiment, in the calibration operation, the setting of the different setting values of the operation parameter of the variation device comprises increasing and decreasing the setting value, wherein for a respective increase in the setting value a first respective adaptation or a characteristic curve of variation is determined, and for a respective decrease of the setting value a second respective adaptation or a characteristic curve of variation is determined, wherein the predetermined relationship comprises the first and the second adaptations or the first and the second characteristic curves of variation. In particular, this embodiment serves to compensate for a mechanical hysteresis, i.e. a backlash, when using mechanically-acting exposure changing devices, for example, a diaphragm-value setting device.

According to a further embodiment, in the calibration operation, the respective brightness value is determined by capturing the electrical signals generated by the image sensor. This enables a particularly precise determination of the predetermined relationship, since here the influence of changes to the setting value or to the respective adjustment values on the image brightness may be determined in a direct, immediate manner. Alternatively, the respective brightness value may also be determined by means of an external brightness sensor.

In some embodiments, only a selectable sub-area, in particular a central area of the image sensor, may be taken into account for determining the respective brightness value. As a result, effects that affect less important image areas when varying the setting value or the at least one adjustment value may be ignored. For example, vignetting that may occur due to the optical properties of the objective when the diaphragm opening is increased may be ignored when determining the predetermined relationship.

In some embodiments, a plausibility control step is performed in the calibration operation in order to identify an erroneous determination of the predetermined relationship, wherein preferably the plausibility control step provides for recognizing an influence on the exposure of the image sensor that is not caused by a change in the setting value of the operation parameter of the variation device and/or in the adjustment value of the operation parameter of the at least one compensation device. Thus, for example, variations in or failures of the illumination during the calibration operation may be recognized, so that the determining of an incorrect predetermined relationship may be avoided.

For example, an invariable illuminated surface (e.g. gray card) may be arranged as a subject in the object space of the motion picture camera which is imaged onto the image sensor, wherein a change in the setting value of the operation parameter of the variation device and an operation of the at least one compensation device with the respectively associated adjustment value take place in accordance with the determined predetermined relationship, and wherein it is checked based on the electrical signals generated by the image sensor whether the exposure of the image sensor remains unchanged, in particular for all photosensitive elements of the image sensor.

In some embodiments, a quality control step is performed in the variation operation in which the sequence of images captured by the motion picture camera is checked for whether at least a selectable respective sub-area of the images has an at least substantially constant brightness value during changing of the setting value of the operation parameter of the variation device.

In a further aspect, the present invention relates to a film production system configured to perform the method of the invention and/or at least one embodiment thereof. The film production system comprises: a digital motion picture camera comprising an image sensor for generating electrical signals in dependence of an exposure of the image sensor; at least two exposure changing devices configured to influence the exposure of the image sensor by a setting of a respective operation parameter and which are selected from a group of exposure changing devices comprising at least an image recording rate setting device, a diaphragm aperture setting device, an electronic shutter of the image sensor, a mechanical shutter, an adjustable neutral density filter and at least one controllable illumination device for illuminating a subject captured by the motion picture camera; and at least one control device configured for carrying out the method according to any one of the described embodiments.

Further embodiments of the invention will be apparent from the dependent claims, the description and the drawing.

Figure 1:
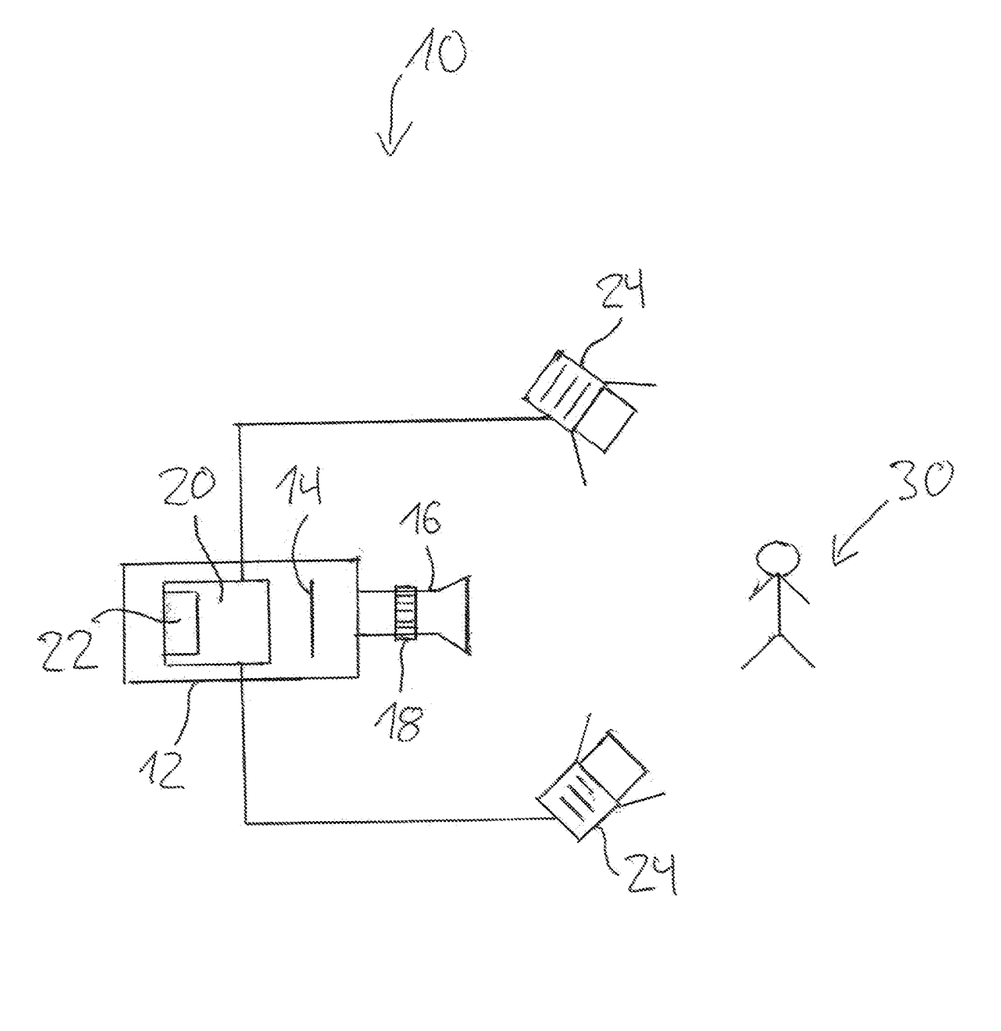
FIG. 1 shows a schematic representation of a system configured for recording a sequence of images of a subject captured by a motion picture camera.

FIG. 1 shows a film production system 10 which comprises a motion picture camera 12 and two illumination devices 24. The motion picture camera 12 comprises an image sensor 14 for generating electrical signals in dependence of an exposure of the image sensor 14. A subject 30 capturable by the motion picture camera 12 is illuminated by means of the illumination devices 24 and imaged onto the image sensor 14 by means of an objective 16. The objective 16 comprises a diaphragm aperture setting device 18 with which the aperture of a diaphragm, for example an iris diaphragm, that is integrated into the objective 16, may be changed. In the embodiment example, the diaphragm aperture setting device 18, which hereinafter for short is also referred to as diaphragm ring 18, is shown as a manually operable diaphragm ring 18. According to variations thereto, a diaphragm ring servo-motor may also be provided to adjust the objective diaphragm by motor, wherein the control of the diaphragm ring servo-motor may be carried out via a corresponding control unit or operating unit.

The motion picture camera 12 comprises a central evaluation and control device, which is also referred to in the following for short as the control device 20. The control device 20 is configured to receive and process the signals generated by the image sensor 14. In particular, the control device 20 is configured to determine a respective brightness value for the entire area of the image sensor 14, sub-areas and/or individual pixels of the image sensor 14.

The control device 20 is further connected to the diaphragm aperture setting device 18 of the objective 16 to receive therefrom a setting value for the operation parameter i.e. the set diaphragm value.

The illumination devices 24 are connected to the control device 20 via control lines to receive control commands from the control device 20 which control the illumination intensity of the respective light generated by the illumination device 24. Said control commands may be transmitted in the form of adjustment values for an operation parameter of the respective illumination device 24, such as illumination intensity.

In the following, a method of recording a sequence of images (also referred to as a running picture sequence or image sequence) is described, which may be performed using, for example, the film production system 10 explained above.

In this exemplarily explained embodiment of the method, the diaphragm aperture setting device 18 serves as a variation device and the two illumination devices 24 serve as respective compensation devices.

As explained in the introduction, in order to achieve creative effects during the recording of an image sequence of the subject 30, the opening of the objective diaphragm is to be changed by means of the diaphragm ring 18, whereby the depth of field range is changed during the recording of the film sequence. However, by changing the diaphragm aperture, the exposure of the image sensor 14 also changes, i.e. the amount of light incident on the image sensor 14. In order to compensate for this change in exposure, the method, explained here by way of example, provides a compensation by a corresponding control of the illumination devices 24, wherein the illumination intensity of the light generated by the illumination devices 24 is changed.

The method is performed here, by way of example, within the control device 20 of the motion picture camera 12. It is understood that in accordance with a modification, an external control device may also be provided, which is advantageously communicatively connected to the control device 20 and the illumination devices 24.

The carrying out of the method includes at least one variation operation and one calibration operation. In the following, the variation operation is explained first.

In the variation operation, the control device 20 receives a setting value for the diaphragm value, i.e. an operation parameter of the diaphragm aperture setting device 18 serving as the variation device. The diaphragm ring 18 may be actuated in this case manually by rotation of the diaphragm ring 18 by a user or in an automated manner with the aid of a diaphragm ring servo-motor (not shown), wherein the control of the diaphragm ring servo-motor may in turn be carried out manually via an operating unit or also in an automated manner with the aid of a control algorithm which may be stored in the control device 20 or also in an external operating unit (not shown). The setting range over which the diaphragm aperture is to be varied may also be referred to as the "depth of field ramp".

The respective current setting value of the diaphragm aperture is transmitted to the control unit 20 and evaluated by this. As already explained in the introduction, changing the diaphragm aperture, with otherwise constant external conditions, in particular, the brightness of the subject, causes an increase or decrease in the brightness captured by the image sensor 14. To ensure that the recorded image sequence does not exhibit any fluctuations in brightness, a compensation is provided for the change in brightness produced by varying the diaphragm aperture.

For this purpose, the control device 20 evaluates the received setting values for the diaphragm aperture and generates adjustment values for the brightness of the light generated by the illumination devices 24. The respective current adjustment value for the illumination devices 24 is determined in dependence of the most recently received setting value of the diaphragm aperture setting device 18 based on a predetermined relationship, which in the exemplified embodiment is stored in a memory device 22 integrated in the control device 20. The predetermined relationship is determined empirically within the framework of a calibration operation explained in more detail below, and associates respective adjustment values for the illumination devices 24 to different setting values of the diaphragm aperture setting device 18, wherein the predetermined relationship effects, at least approximately, a complete compensation of an influence on the exposure of the image sensor 14, caused by the changing of the setting value of the diaphragm aperture, by means of a change in the respective adjustment value. The illumination devices 24 receive the respective current adjustment value from the control device 20 and adjust the intensity of the generated light accordingly.

For example, when the diaphragm aperture is decreased, which corresponds to setting a higher nominal diaphragm value, the exposure incident on the image sensor 14 is decreased so that the illumination devices 24 are controlled such that they increase the brightness of the generated light in accordance with the decrease in the diaphragm aperture. Correspondingly, when the diaphragm aperture is increased, the brightness of the generated light is decreased.

In the present embodiment, the diaphragm aperture setting device 18 and the illumination devices 24 represent respective exposure changing devices.

The film production system 10 may comprise still further exposure changing devices, for example, an electronic shutter of the image sensor 14 or an additional mechanical shutter of the motion picture camera 12 which may be configured as a rotating sector diaphragm, for example. Furthermore, an exposure changing device may also be formed from an image recording rate setting device, which may be integrated in the control device 20 of the motion picture camera 12, for example. Another exposure changing device may be formed by an adjustable neutral density filter (not shown), which may be arranged at the light inlet side or also at the light outlet side of the objective 16. Such a neutral density filter is configured to change its transmission in response to a drive signal without substantially affecting the transmitted light wavelength. A further example of an exposure changing device is a so-called "video wall" or video screen which, in the manner of an oversized screen, has a plurality of pixels which can be controlled with respect to their luminosity and their light color, and with whose help, for example, a still image or also an image sequence may be added to the subject 30 to be recorded, for example, in the form of a background image.

The allocating of the diaphragm aperture setting device 18 as a variation device and the illumination devices 24 as compensation devices explained in the present embodiment is to be understood as exemplary only. According to various modifications, the electronic or mechanical shutter of the motion picture camera 12 may also be used as the compensation device, whereby exposures caused by changes in diaphragm aperture are compensated by an adjustment to the exposure time. However, said electronic or mechanical shutter may also itself be used as a variation device in order to achieve, for example, stroboscopic image effects by changing the exposure time.

It is understood that there exists still numerous other combination or allocating possibilities in which the available exposure changing devices may be used as a variation device or as a compensation device.

In the following, the performing of the calibration operation will now be explained in more detail. Firstly, it must be ensured that the intensity of the light entering the motion picture camera 12—more precisely, the intensity of the light entering the objective 16—is kept constant during the performing of the calibration operation. Thus, for example, no additional lighting may be switched on or off during the performing of a calibration run which is not involved in the performing of the method according to the invention. The determining of the predetermined relationship may take place as a result of setting in succession different setting values for the diaphragm aperture and simultaneously thereto, determining a respective brightness value with the help of the image sensor 14, which accordingly represents the exposure of the image sensor 14. This can be done for a plurality of different setting values in discrete steps, in particular, also quasi-continuously. For each of the different setting values, by changing the value of the operation parameter, i.e. the illumination intensity of a respective illumination device 24, a respective adaptation of the adjustment value is determined which causes the respective brightness value of the image sensor 14 to correspond, at least substantially, to a desired value which is identical for the different setting values of the diaphragm aperture. In other words, by means of a control loop with the setting value of the diaphragm aperture as an input variable and the adjustment value for a respective illumination device 24 as an output variable, the brightness captured by the image sensor 14 may be kept constant. The diaphragm values and the associated adjustment values may be stored as pairs of values or initially temporarily stored in order to determine a respective predetermined relationship on the basis thereof and where appropriate using further data processing steps such as filtering or equalization computations, and which relationship may then be stored in the storage device 22. The determined predetermined relationship thus corresponds to the entirety of the empirically determined pairs of values (setting value and respectively adapted adjustment value).

The calibration operation may be performed in such a way that a respective predetermined relationship is determined separately for each of the illumination devices 24, i.e. the respective other illumination device 24 is kept constant with respect to its illumination intensity or is also deactivated. Generally, however, both illumination devices 24 may also be included in the determination of a common predetermined relationship, wherein the required adaptation of the adjustment value for the illumination devices 24 may be determined equally for both illumination devices 24 or also determined in accordance with a predefined ratio. In the calibration operation, respective predetermined relationships may be determined for one or more combinations of respective variation and compensation devices which are stored in the storage device 22 and are retrieved or read out accordingly from the storage device 22 by the control device 20 when the variation operation is performed.

According to a modification, storage of the one or more predetermined relationships may also take place centrally or decentrally in external storage devices. For example, storage may take place in a respective storage device associated with an exposure changing device or in a network-based database.

According to a further modification of the method, when determining the predetermined relationships using the image sensor 14, respective characteristic curves may be determined which are determined by varying the respective setting values of the associated exposure changing device and which also are stored accordingly in the memory device 22. The determination of predetermined relationships on the basis of characteristic curves has been explained above. In particular, the different setting values of the operation parameter of the variation device (e.g. the diaphragm aperture setting device 18) may be set in succession (again, with the intensity of the light entering the motion picture camera being constant) and, simultaneously thereto, respective associated brightness values representing the exposure of the image sensor 14 may be determined based on image signals from the image sensor 14, wherein a characteristic curve of variation is empirically determined on the basis of the different setting values and the associated brightness values. Furthermore, at least one characteristic curve of compensation is determined which, for a respective compensation device (e.g. illumination device 24), associates to a desired change in a brightness value captured by means of the image sensor 14 a necessary change in the adjustment value of this compensation device, i.e. necessary for obtaining the desired change in brightness value. The determining of this characteristic curve of compensation again may be carried out experimentally, or also by analytical computation, namely, when the correlation between an input variable and an output variable is known in advance for the compensation device in question. Said characteristic curves may be defined by discrete values or by a continuous or quasi-continuous course. For a subsequent variation operation, the respective adjustment value of the operation parameter of the compensation device (e.g. the illumination device 24) may thus be determined and stored based on the characteristic curve of variation and the at least one characteristic curve of compensation, in particular by a linear combination of these characteristic curves, so that for the variation operation ultimately corresponding correction values are available.

LIST OF REFERENCE NUMBERS 10 film production system
12 motion picture camera
14 image sensor
16 objective
18 diaphragm aperture setting device
20 control device
22 memory device
24 illumination device
30 subject

The invention claimed is:

1. A method for recording a sequence of images by means of a digital motion picture camera comprising an image sensor for generating electrical signals in dependence of an exposure of the image sensor, wherein at least two exposure changing devices are provided which are configured to influence the exposure of the image sensor by a setting of a respective operation parameter and which are selected from a group of exposure changing devices comprising at least one image recording rate setting device, a diaphragm aperture setting device, an electronic shutter of the image sensor, a mechanical shutter, an adjustable neutral density filter and at least one controllable illumination device for illuminating a subject which can be captured by the motion picture camera, wherein one of the exposure changing devices is provided as a variation device or can be selected as such, and at least one further exposure changing device, different to the variation device, is provided as an at least one compensation device or can be selected as such, wherein at least one control device is provided, which is configured to receive a setting value of the operation parameter of the variation device and to output a respective adjustment value to the at least one compensation device, the method comprising the following steps which are performed in a variation operation during a recording of a sequence of images:
  influencing the exposure of the image sensor by changing the setting value of the operation parameter of the variation device;
  receiving the changed setting value;
  determining a respective adjustment value of the operation parameter of the at least one compensation device and outputting the respective adjustment value from the control device to the at least one compensation device in dependence of the received changed setting value of the operation parameter of the variation device, wherein the respective adjustment value is selected such that the influence on the exposure of the image sensor caused by the change to the setting value is at least substantially compensated by a change to the respective adjustment value; and
  operating the at least one compensation device in accordance with the outputted respective adjustment value,
wherein the respective adjustment value of the operation parameter of the at least one compensation device is determined in dependence of the changed setting value of the operation parameter of the variation device based on a predetermined relationship between different setting values of the operation parameter of the variation device and associated adjustment values,
wherein in a calibration operation, which is performed prior to the variation operation, the predetermined relationship between the different setting values of the operation parameter of the variation device and the associated adjustment values is determined and stored in a storage device connected to or is connectable to the control device,
wherein determining the predetermined relationship comprises:
  for a constant intensity of light entering the motion picture camera, setting in succession the different setting values of the operation parameter of the variation device and simultaneously thereto, determining respective associated brightness values representing the exposure of the image sensor based on image signals from the image sensor, wherein a characteristic curve of variation is determined on the basis of the different setting values and the associated brightness values; and
  determining computationally or experimentally at least one characteristic curve of compensation which, for a respective compensation device, associates a desired change in a brightness value captured by the image sensor with a necessary change to the adjustment value of this compensation device,
wherein, in the variation operation, the respective adjustment value of the operation parameter of the at least one compensation device is determined based on the characteristic curve of variation and the at least one characteristic curve of compensation.

2. A method according to claim 1,
wherein as a variation device, at least one of
a mechanical or an electronic shutter of the image sensor, whose operation parameter is an exposure time;
a diaphragm aperture setting device, whose operation parameter is a diaphragm value; or
an image recording rate setting device, whose operation parameter is an image recording rate of the image sensor,
is provided or selectable.

3. A method in accordance with claim 1,
wherein experimentally generating the characteristic curve of compensation comprises, for a constant intensity of light entering the motion picture camera, setting in succession different adjustment values of the at least one compensation device and simultaneously thereto, determining respective associated brightness values representing the exposure of the image sensor based on image signals from the image sensor, wherein the characteristic curve of compensation is determined on the basis of the different adjustment values and the associated brightness values.

4. A method in accordance with claim 1,
wherein, in the calibration operation, setting the different setting values of the operation parameter of the variation device comprises increasing and decreasing the setting value, wherein for a respective increase in the setting value a first respective characteristic curve of variation is determined and for a respective decreasing of the setting value a second respective characteristic curve of variation is determined, and wherein the predetermined relationship comprises the first and second characteristic curves of variation.

5. A method for recording a sequence of images by means of a digital motion picture camera comprising an image sensor for generating electrical signals in dependence of an exposure of the image sensor, wherein at least two exposure changing devices are provided which are configured to influence the exposure of the image sensor by a setting of a respective operation parameter and which are selected from a group of exposure changing devices comprising at least one image recording rate setting device, a diaphragm aperture setting device, an electronic shutter of the image sensor, a mechanical shutter, an adjustable neutral density filter and at least one controllable illumination device for illuminating a subject which can be captured by the motion picture camera, wherein one of the exposure changing devices is provided as a variation device or can be selected as such, and at least one further exposure changing device, different to the variation device, is provided as an at least one compensation device or can be selected as such,
  wherein at least one control device is provided, which is configured to receive a setting value of the operation parameter of the variation device and to output a respective adjustment value to the at least one compensation device,
  the method comprising the following steps which are performed in a variation operation during a recording of a sequence of images:
    influencing the exposure of the image sensor by changing the setting value of the operation parameter of the variation device;
    receiving the changed setting value;
    determining a respective adjustment value of the operation parameter of the at least one compensation device and outputting the respective adjustment value from the control device to the at least one compensation device in dependence of the received changed setting value of the operation parameter of the variation device, wherein the respective adjustment value is selected such that the influence on the exposure of the image sensor caused by the change to the setting value is at least substantially compensated by a change to the respective adjustment value; and operating the at least one compensation device in accordance with the outputted respective adjustment value, wherein the respective adjustment value of the operation parameter of the at least one compensation device is determined in dependence of the changed setting value of the operation parameter of the variation device based on a predetermined relationship between different setting values of the operation parameter of the variation device and associated adjustment values, wherein in a calibration operation, which is performed prior to the variation operation, the predetermined relationship between the different setting values of the operation parameter of the variation device and the associated adjustment values is determined and stored in a storage device connected to or is connectable to the control device, wherein determining the predetermined relationship comprises:

for a constant intensity of light entering the motion picture camera, setting in succession the different setting values of the operation parameter of the variation device and simultaneously thereto, determining a respective brightness value representing the exposure of the image sensor; and for each of the different setting values, a respective adaptation of the adjustment value is determined by changing the value of the operation parameter of the at least one compensation device such that the respective adaptation causes the respective brightness value to correspond at least substantially to a desired value, the desired value being identical for the different setting values of the operation parameter of the variation device, wherein a plurality of external illumination devices are provided as a plurality of compensation devices;

wherein, in the calibration operation, determining the predetermined relationship between the different setting values of the operation parameter of the variation device and the associated adjustment values of the external illumination devices comprises determining specific relationships performed specifically for a respective photosensitive element of the image sensor or for a respective group of adjacent photosensitive elements of the image sensor; and wherein, in the subsequent variation operation, a respective adjustment value is outputted to the plurality of compensation devices on the basis of the specific relationships.

6. A method according to claim 5,
wherein as a variation device, at least one of
a mechanical or an electronic shutter of the image sensor, whose operation parameter is an exposure time;
a diaphragm aperture setting device, whose operation parameter is a diaphragm value; or
an image recording rate setting device, whose operation parameter is an image recording rate of the image sensor, is provided or selectable.

7. A method in accordance with claim 5,
wherein, in the calibration operation, determining the specific relationships is performed separately for each of the plurality of external illumination devices or for a respective subset of the plurality of external illumination devices.

8. A method in accordance with claim 5,
wherein, in the calibration operation, setting the different setting values of the operation parameter of the variation device comprises increasing and decreasing the setting value,
wherein for a respective increase in the setting value a first respective adaptation is determined and for a respective decreasing of the setting value a second respective adaptation is determined, and wherein the predetermined relationship comprises the first and second adaptations.

9. A method for recording a sequence of images by means of a digital motion picture camera comprising an image sensor for generating electrical signals in dependence of an exposure of the image sensor, wherein at least two exposure changing devices are provided which are configured to influence the exposure of the image sensor by a setting of a respective operation parameter and which are selected from a group of exposure changing devices comprising at least one image recording rate setting device, a diaphragm aperture setting device, an electronic shutter of the image sensor, a mechanical shutter, an adjustable neutral density filter and at least one controllable illumination device for illuminating a subject which can be captured by the motion picture camera, wherein one of the exposure changing devices is provided as a variation device or can be selected as such, and at least one further exposure changing device, different to the variation device, is provided as an at least one compensation device or can be selected as such, wherein at least one control device is provided, which is configured to receive a setting value of the operation parameter of the variation device and to output a respective adjustment value to the at least one compensation device, the method comprising the following steps which are performed in a variation operation during a recording of a sequence of images:

influencing the exposure of the image sensor by changing the setting value of the operation parameter of the variation device;

receiving the changed setting value;

determining a respective adjustment value of the operation parameter of the at least one compensation device and outputting the respective adjustment value from the control device to the at least one compensation device in dependence of the received changed setting value of the operation parameter of the variation device, wherein the respective adjustment value is selected such that the influence on the exposure of the image sensor caused by the change to the setting value is at least substantially compensated by a change to the respective adjustment value; and operating the at least one compensation device in accordance with the outputted respective adjustment value, wherein the respective adjustment value of the operation parameter of the at least one compensation device is determined in dependence of the changed setting value of the operation parameter of the variation device based on a predetermined relationship between different setting values of the operation parameter of the variation device and associated adjustment values, wherein in a calibration operation, which is performed prior to the variation operation, the predetermined relationship between the different setting values of the operation parameter of the variation device and the associated adjustment values is determined and stored in a storage device connected to or is connectable to the control device, wherein determining the predetermined relationship comprises:

for a constant intensity of light entering the motion picture camera, setting in succession the different setting values of the operation parameter of the variation device and simultaneously thereto, determining a respective brightness value representing the exposure of the image sensor; and for each of the different setting values, a respective adaptation of the adjustment value is determined by changing the value of the operation parameter of the at least one compensation device such that the respective adaptation causes the respective brightness value to correspond at least substantially to a desired value, the desired value being identical for the different setting values of the operation parameter of the variation device, wherein, in the calibration operation, the respective brightness value is determined from the electrical signals generated by the image sensor, and wherein for determining the respective brightness value only a selectable sub-area of the image sensor is taken into account.

10. A method according to claim 9, wherein as a variation device, at least one of a mechanical or an electronic shutter of the image sensor, whose operation parameter is an exposure time;

a diaphragm aperture setting device, whose operation parameter is a diaphragm value; or an image recording rate setting device, whose operation parameter is an image recording rate of the image sensor, is provided or selectable.

11. A method in accordance with claim 9, wherein, in the calibration operation, setting the different setting values of the operation parameter of the variation device comprises increasing and decreasing the setting value, wherein for a respective increase in the setting value a first respective adaptation is determined and for a respective decreasing of the setting value a second respective adaptation is determined, and wherein the predetermined relationship comprises the first and second adaptations.

12. A method for recording a sequence of images by means of a digital motion picture camera comprising an image sensor for generating electrical signals in dependence of an exposure of the image sensor, wherein at least two exposure changing devices are provided which are configured to influence the exposure of the image sensor by a setting of a respective operation parameter and which are selected from a group of exposure changing devices comprising at least one image recording rate setting device, a diaphragm aperture setting device, an electronic shutter of the image sensor, a mechanical shutter, an adjustable neutral density filter and at least one controllable illumination device for illuminating a subject which can be captured by the motion picture camera, wherein one of the exposure changing devices is provided as a variation device or can be selected as such, and at least one further exposure changing device, different to the variation device, is provided as an at least one compensation device or can be selected as such, wherein at least one control device is provided, which is configured to receive a setting value of the operation parameter of the variation device and to output a respective adjustment value to the at least one compensation device, the method comprising the following steps which are performed in a variation operation during a recording of a sequence of images:

influencing the exposure of the image sensor by changing the setting value of the operation parameter of the variation device;

receiving the changed setting value;

determining a respective adjustment value of the operation parameter of the at least one compensation device and outputting the respective adjustment value from the control device to the at least one compensation device in dependence of the received changed setting value of the operation parameter of the variation device, wherein the respective adjustment value is selected such that the influence on the exposure of the image sensor caused by the change to the setting value is at least substantially compensated by a change to the respective adjustment value; and operating the at least one compensation device in accordance with the outputted respective adjustment value, wherein the respective adjustment value of the operation parameter of the at least one compensation device is determined in dependence of the changed setting value of the operation parameter of the variation device based on a predetermined relationship between different setting values of the operation parameter of the variation device and associated adjustment values, wherein in a calibration operation, which is performed prior to the variation operation, the predetermined relationship between the different setting values of the operation parameter of the variation device and the associated adjustment values is determined and stored in a storage device connected to or is connectable to the control device, wherein determining the predetermined relationship comprises:

for a constant intensity of light entering the motion picture camera, setting in succession the different setting values of the operation parameter of the variation device and simultaneously thereto, determining a respective brightness value representing the exposure of the image sensor; and for each of the different setting values, a respective adaptation of the adjustment value is determined by changing the value of the operation parameter of the at least one compensation device such that the respective adaptation causes the respective brightness value to correspond at least substantially to a desired value, the desired value being identical for the different setting values of the operation parameter of the variation device, wherein, in the calibration operation, a plausibility control step is performed to identify an erroneous determining of the predetermined relationship, wherein the plausibility checking step provides for identifying any influence on the exposure of the image sensor which is not caused by a change in the setting value of the operation parameter of the variation device or a change in the adjustment value of the operation parameter of the at least one compensation device.

13. A method according to claim 12,
wherein as a variation device, at least one of
a mechanical or an electronic shutter of the image sensor, whose operation parameter is an exposure time;
a diaphragm aperture setting device, whose operation parameter is a diaphragm value; or
an image recording rate setting device, whose operation parameter is an image recording rate of the image sensor,
is provided or selectable.

14. A method in accordance with claim 12,
wherein, in the calibration operation, setting the different setting values of the operation parameter of the variation device comprises increasing and decreasing the setting value, wherein for a respective increase in the setting value a first respective adaptation is determined and for a respective decreasing of the setting value a second respective adaptation is determined, and wherein the predetermined relationship comprises the first and second adaptations.

15. A method for recording a sequence of images by means of a digital motion picture camera comprising an image sensor for generating electrical signals in dependence of an exposure of the image sensor, wherein at least two exposure changing devices are provided which are configured to influence the exposure of the image sensor by a setting of a respective operation parameter and which are selected from a group of exposure changing devices comprising at least one image recording rate setting device, a diaphragm aperture setting device, an electronic shutter of the image sensor, a mechanical shutter, an adjustable neutral density filter and at least one controllable illumination device for illuminating a subject which can be captured by the motion picture camera, wherein one of the exposure changing devices is provided as a variation device or can be selected as such, and at least one further exposure changing device, different to the variation device, is provided as an at least one compensation device or can be selected as such,
wherein at least one control device is provided, which is configured to receive a setting value of the operation parameter of the variation device and to output a respective adjustment value to the at least one compensation device,
the method comprising the following steps which are performed in a variation operation during a recording of a sequence of images:
influencing the exposure of the image sensor by changing the setting value of the operation parameter of the variation device;
receiving the changed setting value;
determining a respective adjustment value of the operation parameter of the at least one compensation device and outputting the respective adjustment value from the control device to the at least one compensation device in dependence of the received changed setting value of the operation parameter of the variation device, wherein the respective adjustment value is selected such that the influence on the exposure of the image sensor caused by the change to the setting value is at least substantially compensated by a change to the respective adjustment value; and
operating the at least one compensation device in accordance with the outputted respective adjustment value,
wherein, in the variation operation, a quality control step is performed in which the sequence of images captured by the motion picture camera is checked as to whether at least a selectable respective sub-area of the images has an at least substantially constant brightness value during the changing of the setting value of the operation parameter of the variation device.

16. A method according to claim 15,
wherein as a variation device, at least one of
a mechanical or an electronic shutter of the image sensor, whose operation parameter is an exposure time;
a diaphragm aperture setting device, whose operation parameter is a diaphragm value; or
an image recording rate setting device, whose operation parameter is an image recording rate of the image sensor,
is provided or selectable.

* * * * *